United States Patent
Dumas et al.

(10) Patent No.: US 10,024,353 B2
(45) Date of Patent: Jul. 17, 2018

(54) RETAINING SPRING NUTPLATE

(71) Applicant: BELL HELICOPTER TEXTRON INC., Fort Worth, TX (US)

(72) Inventors: Dominique Dumas, Mirabel (CA); Jarel Clairoux, Sainte-Therese (CA); Robert Boutin, Mirabel (CA)

(73) Assignee: Bell Helicopter Textron Inc., Fort Worth, TX (US)

( * ) Notice: Subject to any disclaimer, the term of this patent is extended or adjusted under 35 U.S.C. 154(b) by 468 days.

(21) Appl. No.: 13/833,217

(22) Filed: Mar. 15, 2013

(65) Prior Publication Data

US 2014/0259625 A1  Sep. 18, 2014

(51) Int. Cl.
*F16B 37/04* (2006.01)

(52) U.S. Cl.
CPC ....... *F16B 37/041* (2013.01); *Y10T 29/49948* (2015.01)

(58) Field of Classification Search
CPC .......................... F16B 37/041; Y10T 29/49948
USPC ........................................................ 411/112
See application file for complete search history.

(56) References Cited

U.S. PATENT DOCUMENTS

| | | | | |
|---|---|---|---|---|
| 2,258,342 A * | 10/1941 | Tinnerman | ..................... | 411/112 |
| 2,495,037 A * | 1/1950 | Tinnerman | ..................... | 411/112 |
| 3,035,624 A * | 5/1962 | Jaworski | ....................... | 411/112 |
| 3,145,753 A * | 8/1964 | Kreider | ......................... | 411/112 |
| 4,270,591 A * | 6/1981 | Gill et al. | ..................... | 411/112 |
| 4,385,858 A | 5/1983 | Bell | | |
| 4,729,706 A * | 3/1988 | Peterson et al. | .............. | 411/175 |
| 5,193,643 A * | 3/1993 | McIntyre | ....................... | 180/312 |
| 5,713,707 A * | 2/1998 | Gagnon | ......................... | 411/175 |
| 5,893,694 A * | 4/1999 | Wilusz et al. | ................ | 411/112 |
| 6,840,727 B1 * | 1/2005 | Vassiliou | ...................... | 411/173 |
| 6,971,830 B2 * | 12/2005 | Hulin et al. | .................. | 411/175 |
| 7,658,579 B1 * | 2/2010 | Stewart et al. | ............... | 411/112 |
| 2011/0020091 A1 * | 1/2011 | Larsen | .................... | F16B 27/00 411/84 |

FOREIGN PATENT DOCUMENTS

FR   1504801 A   12/1967

OTHER PUBLICATIONS

Office Action dated Apr. 17, 2015 from counterpart CA App. No. 2,844,213.
Extended European Search Report in related European patent application No. 13165128, dated Oct. 16, 2013, 6 pages.

* cited by examiner

*Primary Examiner* — Christopher M Koehler
(74) *Attorney, Agent, or Firm* — James E. Walton

(57) ABSTRACT

A fastening assembly includes a body and a retaining device. The retaining device is secured to the body for placement along a surface. The body is configured to flex between a relaxed state and a compressed state. The body is compressed between two external surfaces in a compressed state to maintain the alignment and position of the retaining device without the fastener. The flexure of the body causes the body to exert an outward spring force against the external surfaces sufficient to maintain the location of the retaining devices before insertion of a fastener. The fastening assembly includes the fastener for insertion into the retaining device.

7 Claims, 4 Drawing Sheets

RETAINING SPRING NUTPLATE

BACKGROUND

1. Field of the Invention

The present application relates generally to fastening assemblies and, more particularly, to a fastening assembly for aircraft installations.

2. Description of Related Art

Aircraft are assembled using many individual parts fastened together with fasteners. During design stages, the accessibility and function of fasteners are addressed. In some instances, design constraints are such that some locations are restricted and provide minimal access to operators. When there is minimal access, special tools and/or customized fasteners may be developed. Specialized tools are typically expensive and not always accessible to operators in the field for repairs or maintenance. The specialized tools may be developed to hold retaining members, such as nut plates, or may be used to insert the fastener itself. To avoid specialized tools, sometimes specialized fasteners are used. Often these are expensive requiring permanency within the part being fastened, thereby greatly increasing the cost for replacement parts if the fastener failed. Specialized fasteners can be expensive especially for replaceable parts.

Although great strides have been made in fastening assemblies, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
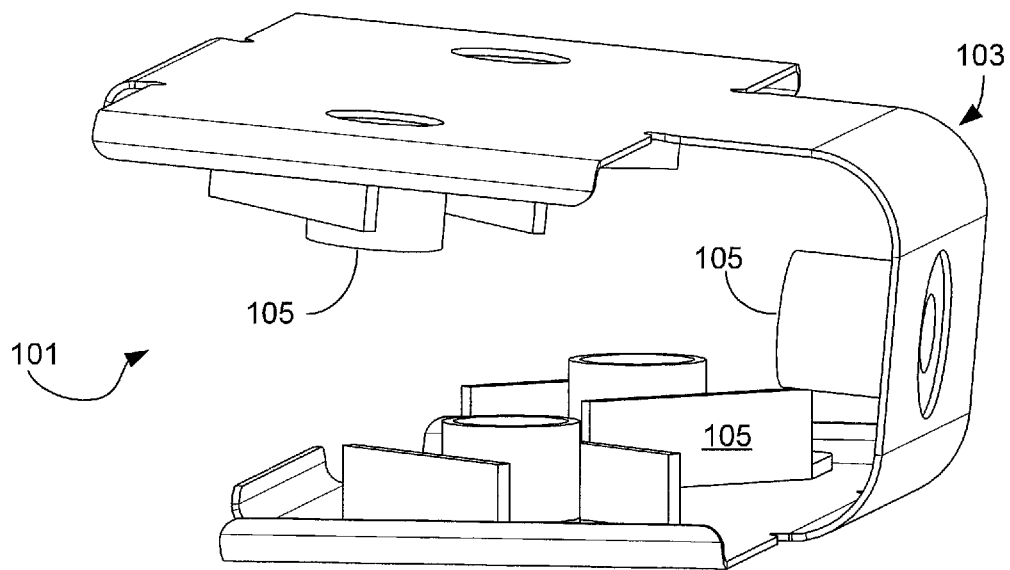
FIG. 1 is a perspective view of a fastening assembly according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
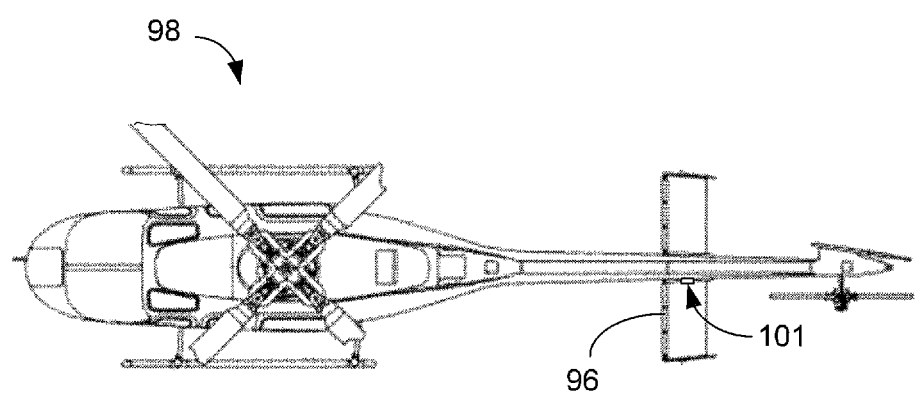
FIG. 2 is a top view of an aircraft using the fastening assembly of FIG. 1.
Figure 3:
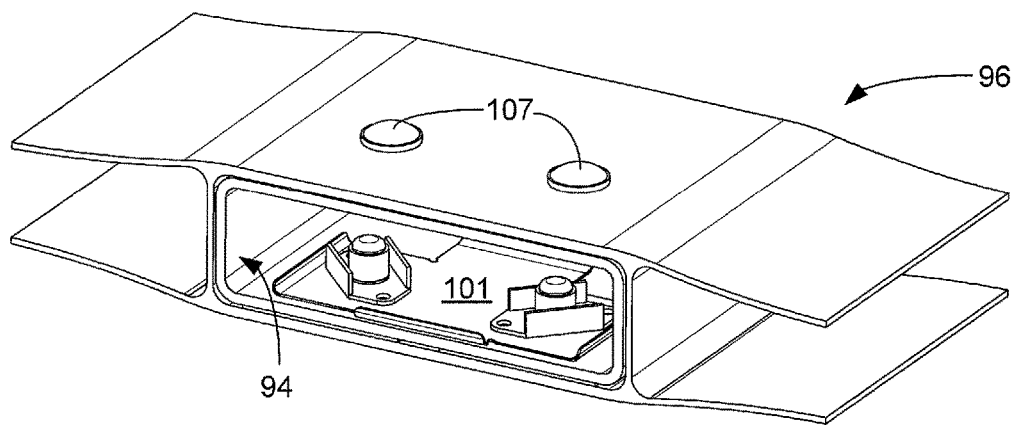
FIG. 3 is a partial perspective view of the fastening assembly of FIG. 1 in a SPAR of the aircraft seen in FIG. 2.

Referring now to FIG. 1-3 in the drawings, a fastening assembly is illustrated. Fastening assembly 101 includes a fastening body 103, a retaining device 105, and a fastener 107 (see FIG. 3). Body 103 is configured to flex between a relaxed state and a compressed state to maintain the alignment and position of retaining device 105, without fastener 107, while located adjacent opposing external surfaces. Body 103 is especially adapted for use in closed areas or areas with tight restricted access. Narrow tubes or channels outside the reach of an operator are contemplated. For example, as seen in FIG. 2, fastening assembly 101 is seen used in a horizontal stabilizer 96 of an aircraft 98. In particular, fastening assembly 101 is shown in FIG. 3 within the SPAR 94 within horizontal stabilizer 96.

Fasteners may be necessary to join materials in restricted areas. If the location of the fasteners is outside the reach of the operator, it can be difficult to retain the orientation, alignment, and/or location of a retaining device prior to insertion of the fastener. Fastening assembly 101 is configured to allow for the locating of a retaining device inside the restricted area before the fastener is inserted. For example, body 103 is configured to locate and hold/secure the retaining device within the restricted area. Body 103 prevents the retaining member from rotating while the fastener is inserted.

Figure 4:
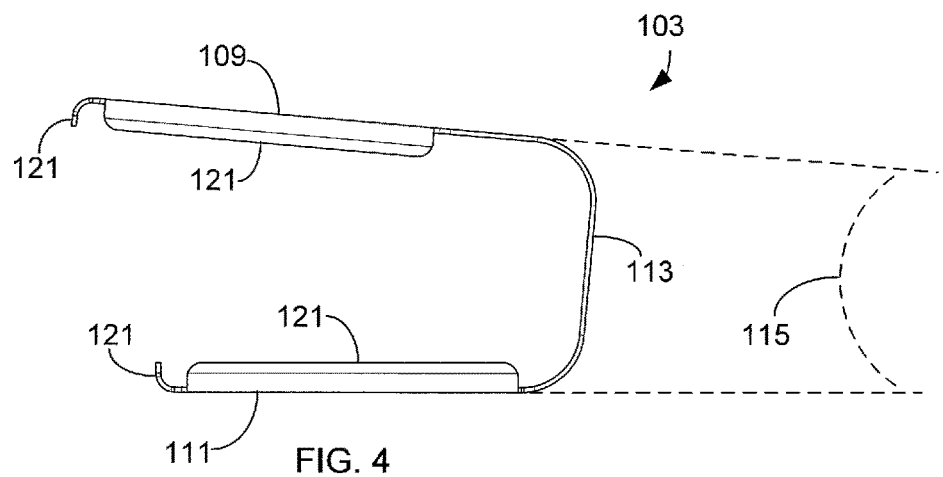
FIG. 4 is a side view of a body of the fastening assembly of FIG. 1.
Figure 5:
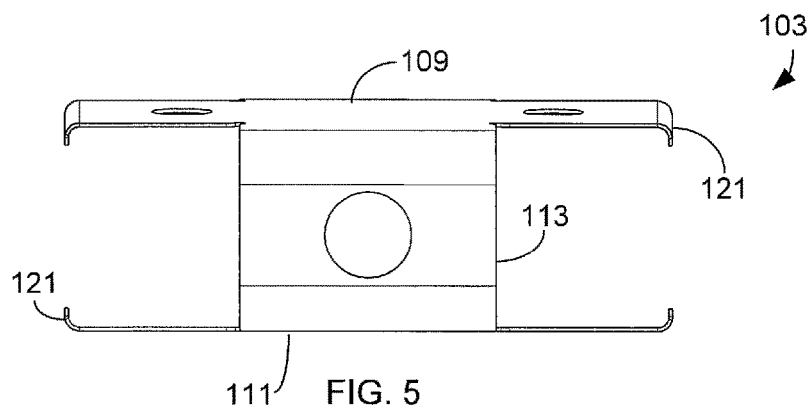
FIG. 5 is a rear view of the body of FIG. 4.

Referring now also to FIGS. 4-5 in the drawings, body 103 is illustrated without retaining device 105 and fasteners 107. Body 103 includes three main portions or members: an upper member 109, a lower member 111, and a joining member 113. Each member 109, 111, 113 is configured to support one or more retaining devices 105. Joining member 113 extends between members 109 and 111. As seen in the figures, body 103 is shown as a single unitary piece of material. For example, in the preferred embodiment, body 103 may be ply sheet metal. It is understood that other embodiments may form body 103 out of separate members, coupling the individual members together. Body 103 may be made out of a plurality of different types of materials. Other materials are contemplated that permit flexure of body 103.

In the preferred embodiment, joining member 113 is a relatively thin piece of material configured to join members 109 and 111 along one side. In other embodiments it is understood that joining member 113 may be located in other locations and in greater numbers. For example, alternative embodiments may include a joining member wherein the member is a spring. Such a spring may be located more centrally to members 109, 111.

Body 103 is illustrated in a relaxed state in FIGS. 4 and 5. In such a relaxed state, upper member 109 and lower member 111 are in a non-parallel orientation with respect to one another. Upper member 109 and lower member 111 form a flexure angle 115. Flexure angle 115 is largest in the relaxed state.

Figure 6:
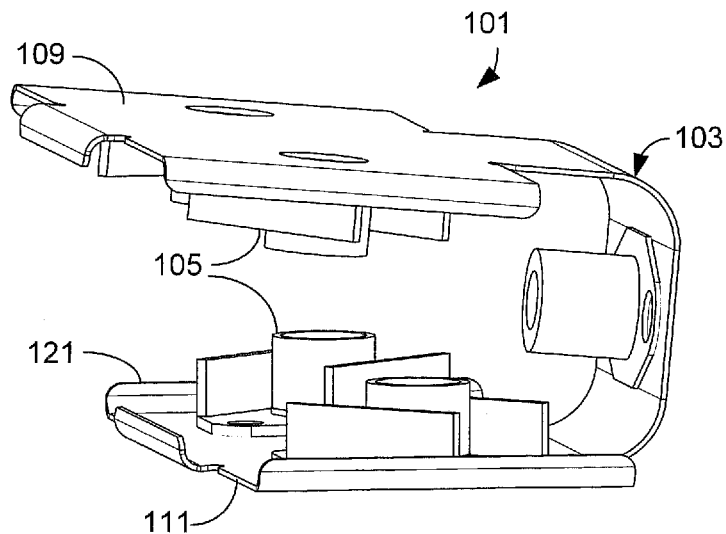
FIG. 6 is a second perspective view of the fastening assembly of FIG. 1 seen in a relaxed state.
Figure 7:
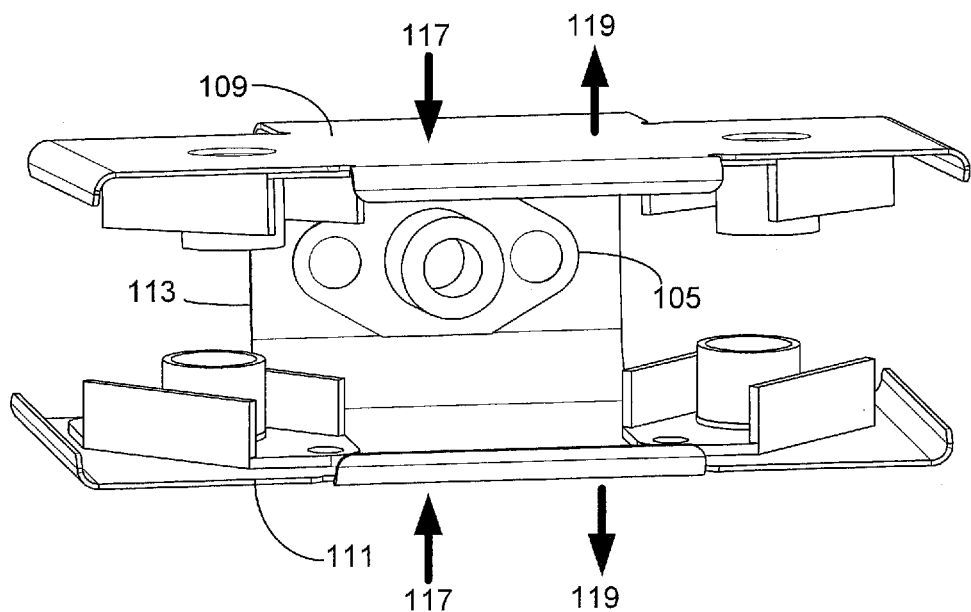
FIG. 7 is a perspective view of the fastening assembly of FIG. 6 in a compressed state.

Referring now also to FIGS. 6 and 7 in the drawings, fastening assembly 101 is illustrated in a relaxed state (FIG. 6) and a compressed state (FIG. 7). Body 103 is configured to receive an external force 117 applied to upper member 109 and lower member 111 sufficient to induce a corresponding flexure in body 103. Such flexure is predominantly seen in joining member 113 but it is understood that portions of members 109 and 111 may also experience some flexure. The degree or amount of flexure is proportional to the amount of force 117 applied. Body 103 is configured to resist flexure thereby exhibiting a spring force 119 equal and opposite to force 117. The spring force 119 is predominantly seen in joining member 113.

As external force 117 is applied, body 103 transitions from a relaxed state into a compressed state, as seen in FIG. 7. The compressed state includes any flexure angle apart from the maximum flexure angle when no external force 117 is applied. The flexure angle 115 may go as low as zero degrees, in which upper member 109 and lower member 111 are parallel. Furthermore, it is understood that flexure angle 115 may decrease below zero degrees in which members 109 and 111 pass a parallel orientation.

While in a compressed state, fastening assembly 101 is inserted into a restricted area between two opposing external surfaces, such as SPAR 94. It is understood that even though SPAR 94 completely surrounds fastening assembly 101 on four sides, fastening assembly 101 may be used wherein the external surfaces are only located adjacent members 109 and 111.

Fastening assembly 101 is configured to translate along the external surfaces adjacent members 109, 111. A lip 121 is formed in body 103 to prevent the damaging of the external surfaces during translation of assembly 101. Furthermore, it is understood that some external surfaces are not smooth, being coarse, thereby having wave-like variations between them. Lip 121 is therefore configured to induce a change in the spring force as a result of variations in the external surfaces during translation. The change in the spring force 119 is proportional to a change in the flexure angle between members 109, 111. The flexure of body 103, and the corresponding spring force 119, is configured to maintain contact between the body and the external surfaces.

Retaining device 105 is configured to be removable from body 103. Once installed with fastener 107, retaining member 105 and/or fastener 107 may become damaged preventing reinsertion together and tightening. Retaining device 105 may be bonded or fastened to body 103, thereby permitting repair and replacement of device 105.

Lip 121 is a rounded over portion of members 109 and 111. In alternative embodiments, lip 121 may include means facilitating the removal of assembly 101 from the restricted area. For example, a lip with a horizontal bend may generate a flange that can be gripped by a tool to provide sufficient force to translate fastening assembly 101 along the external surfaces for removal.

Retaining members 105 are illustrated secured to members 109, 111, and 113. It is understood that retaining members 105 may be located on any one of the members 109, 111, 113 individually or in any combination collectively. One or more retaining members 105 may be used. Retaining members 105 are configured to be any number of items used in the operation of a fastener to provide a localized compressive force. This may be seen through interference fit with fastener 107 being a bolt, for example, and retaining member 105 being a nut plate, for example. Retaining member 105 may also be a nut and washer combination in other forms.

Figure 8:
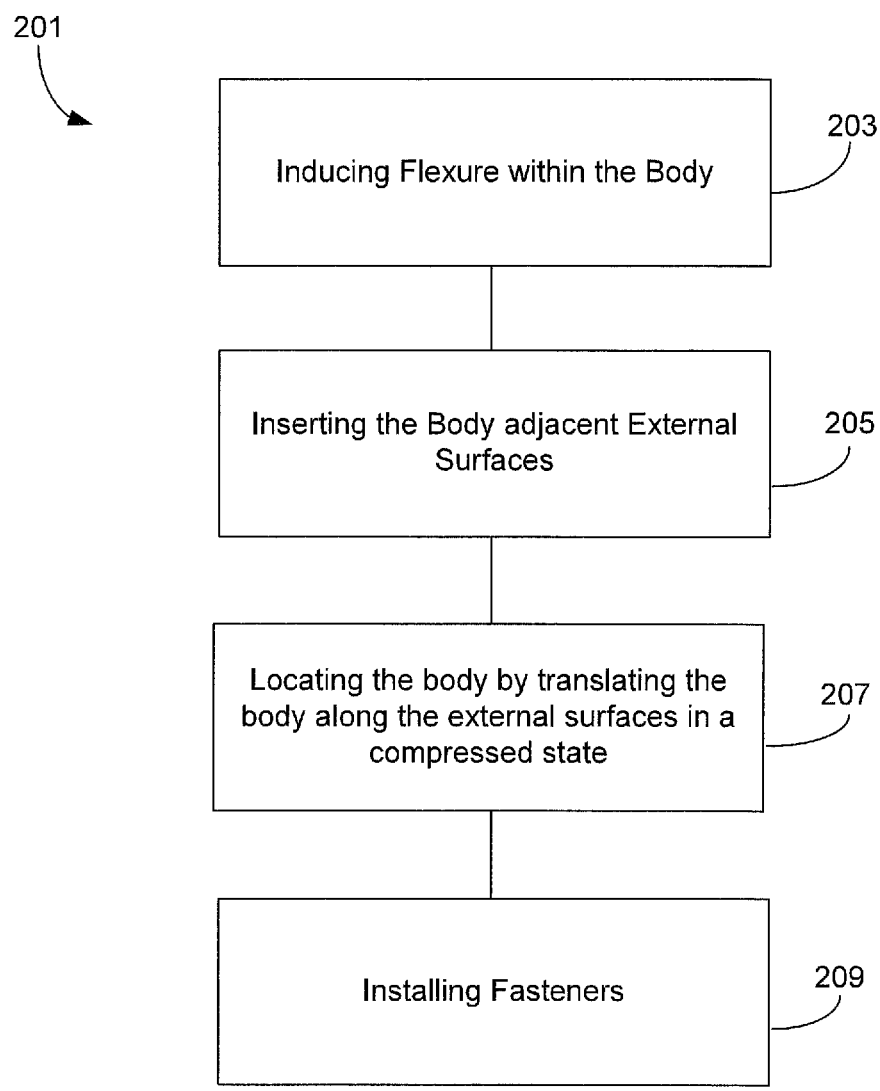
FIG. 8 is a table view of the steps of installing the fastening assembly of FIG. 1.

Referring now also to FIG. 8 in the drawings, the steps 201 for installing fastener assembly 101 are illustrated. Fastener assembly 101 is configurable to different sizes. An appropriate sized fastener assembly is one in which the restricted space between two external surfaces is smaller than the relaxed state of the fastener assembly. For installation between external surfaces, a flexure is induced 203 within body 103 to generate a spring force 119. Fastening assembly is then inserted 205 between the external surfaces. The spring force 119, being sufficient to hold body 103 in contact with the external surfaces in the restricted area. Fastening assembly 101 is then located 207 within the restricted area between the external surfaces by translating body 103 to a desired location. During translation, lips 121 prevent damage to the external surfaces and cause the flexure angle of body 103 to adjust as a result of variations in surface conditions. The spring force 119 maintains contact between members 109, 111 with the external surfaces. Once located, the spring force 119 is sufficient to maintain or hold retaining members 105 in alignment fastening holes in the external surfaces without the need for support from a tool, or operator. The alignment is maintained as a result of the spring force 119 until fasteners 107 are inserted through the fastening holes and engage the retaining members 105.

Where the external surfaces are a SPAR 94, before installation of fasteners 107, a layer of skin is inserted over SPAR 94. For repair or replacement of fastening assembly 101, the fasteners may be removed and body 103 may be removed by translation along the external surfaces.

The current application has many advantages over the prior art including the following: (1) fastening assembly permits the number of fastener holes in the SPAR can be reduced due to the body securing the retaining members; (2) removal and installation of fastening assembly may be performed without having to remove the horizontal stabilizer; (3) the body holds the retaining member against the external surfaces in proper alignment and prevents the retaining members from rotating while inserting the fastener; (4) the spring force manages the inconsistent external surfaces; (5) easy access to nut plate for installation and removal; (6) easily separable and replaceable; and (7) avoids the need for special tools to maintain or install.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A fastener assembly, comprising:
   a first fastener;
   a second fastener;
   a body, comprising;
      a upper member having a first lip;
      a lower member having a second lip; and
      a joining member;
      wherein the upper member and the lower member are separated by the joining member, the upper member forming a flexure angle with respect to the lower member, the flexure angle being configured to change during flexure of the body;
   a first retaining device located in the upper member, the first retaining device configured to receive the first fastener; and
   a second retaining device located in the lower member, the second retaining device configured to receive the second fastener;
   the body configured to flex between a relaxed state and a compressed state to maintain alignment and position of the retaining device without the fastener while located adjacent opposing external surfaces, the body exerting an outward spring force while in a compressed state, so as to apply a force against the external surfaces, wherein the alignment is achieved when the body is in the compressed state and the alignment is not achieved when the body is in the relaxed state;
   wherein the upper member and the lower member are only parallel when the flexure angle is zero;
   wherein the upper member and the lower member are both planar;
   wherein the first lip of the upper member and the second lip of the lower member are adjacent the external surfaces;
   wherein the first lip of the upper member and the second lip of the lower member are configured to induce a change in the spring force as a result of variations in the external surfaces, the body configured to translate along the external surfaces in a compressed state; and
   wherein the spring force changes in proportion to the amount of flexure of the body.

2. The fastener assembly of claim 1, further comprising:
   a third fastener; and
   a third retaining device located in the joining member, the third retaining device configured to receive the third fastener.

3. The fastener assembly of claim 1, wherein the body is configured to translate along the external surfaces in the compressed state.

4. The fastener assembly of claim 3, wherein the spring force of the body is configured to change during translation of the body along the external surfaces.

5. The fastener assembly of claim 1, wherein the flexing of the body is configured to maintain contact between the body and the external surfaces.

6. The fastener assembly of claim 1, wherein the first lip of the upper member and the second lip of the lower member are configured to assist in the removal of the body from the external surfaces; and
   wherein at least one of the first lip and the second lip is comprised of a flange.

7. The fastener assembly of claim 1, wherein at least one of the fasteners is configured to secure the body within a SPAR of an aircraft.

* * * * *